UNITED STATES PATENT OFFICE.

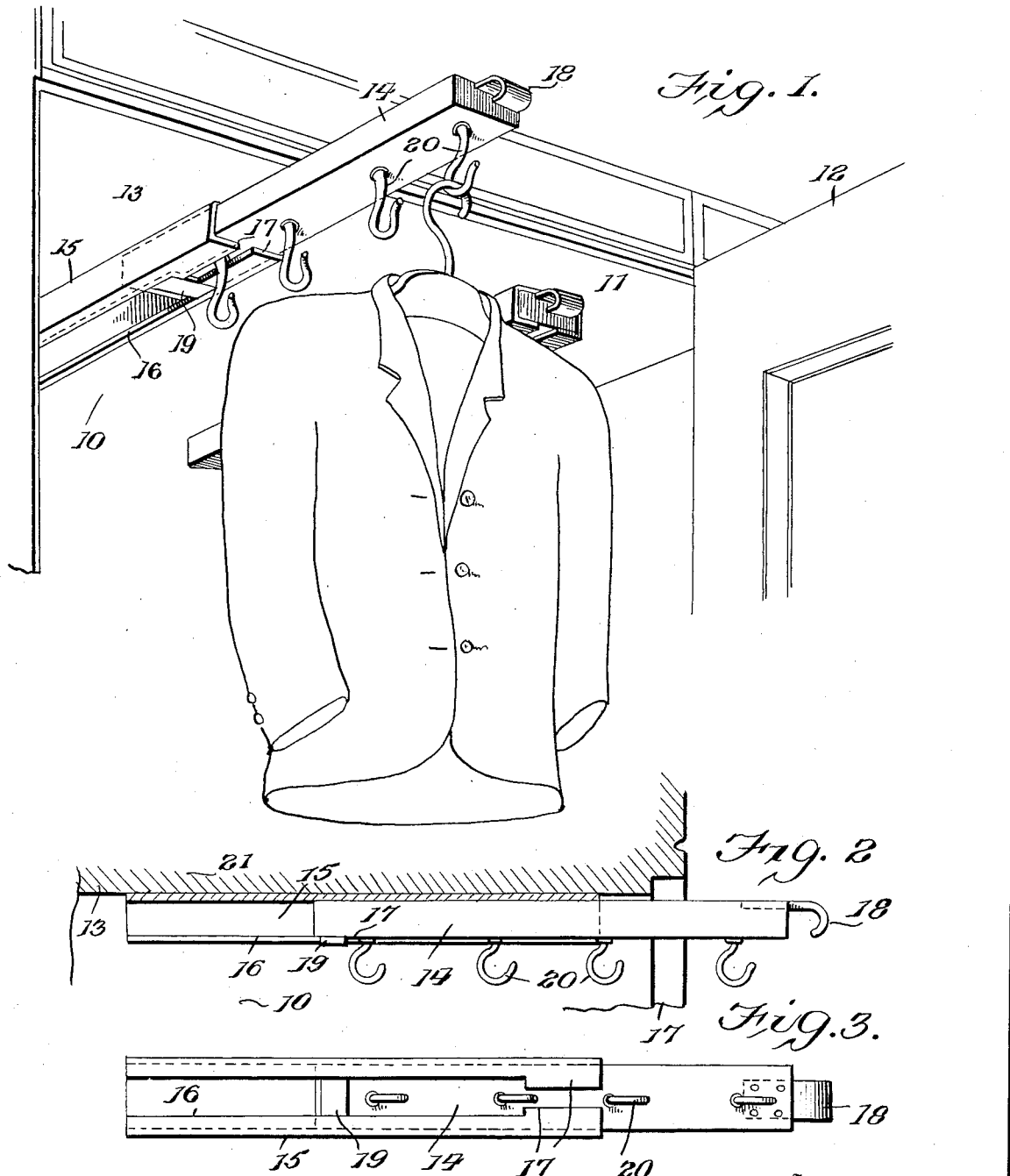

EMANUEL G. KOHOUT, OF NEW YORK, N. Y.

GARMENT-HANGER.

1,132,190.  Specification of Letters Patent.  Patented Mar. 16, 1915.

Application filed February 3, 1914. Serial No. 816,210.

*To all whom it may concern:*

Be it known that I, EMANUEL G. KOHOUT, citizen of the United States, residing at New York, in the county of New York and State of New York, have invented certain new and useful Improvements in Garment-Hangers, of which the following is a specification.

My invention relates to new and useful improvements in garment hangers and more particularly to racks for use in supporting garments in closets, show cases and other places of like nature, the primary object of my invention being the provision of a garment supporting rack which is movably mounted in order that it may be drawn out to bring the garments within easy reach or moved back to position the garments out of the way.

Specifically, the object of my invention is the provision of a movable rack of the above described character for use in closets so arranged that the rack proper may be drawn to extend exteriorly of the closet in order that the garments may be readily removed from the rack or positioned thereon.

A further object of my invention is, therefore the provision of a runway or guide which may be mounted in the closet to support the rack.

A further object of my invention is the provision of means for limiting the outward movement of the rack with respect to the runway to prevent its disengagement therefrom.

With these and other objects in view, my invention will be more fully described, illustrated in the accompanying drawing, and then specifically pointed out in the claim which is attached to and forms a part of this application.

In the drawing: Figure 1 is a perspective view illustrating my improved rack in use; Fig. 2 is a side elevation of the rack; the guide or runway being shown in longitudinal section; Fig. 3 is a bottom plan view of the rack and its runway, the rack in Figs. 2 and 3 being shown in partially extended position.

Corresponding and like parts are referred to in the following description and indicated in all the views of the drawing by the same reference characters.

In order to insure a clear and complete understanding of my invention I have illustrated the same in connection with a conventional form of closet 10 having a door opening 11, door 12 and ceiling 13.

My improved rack includes a rack proper, indicated as a whole by the numeral 14 and a runway or guide, indicated as a whole by the numeral 15. The runway or guide is preferably formed of sheet metal and includes a tubular body portion, preferably rectangular in cross section and with its lower face slotted throughout its entire length as shown at 16. This slot at one end, which in use is the outer end of the runway, is reduced as shown to provide oppositely disposed stop shoulders 17, the runway being preferably open at both ends.

The rack proper consists of a body portion or bar corresponding in cross sectional shape and size to the internal cross sectional shape and size of the runway or guide and slidably mounted in the guide. The body portion is provided at its outer end with a handle 18, preferably in the form of a hook which may be readily grasped to reciprocate the rack in its guide, the body portion of this handle being preferably countersunk in the upper face of the rack. At its rear end the rack is provided with a downwardly directed stop shoulder 19 proportioned to extend through the body portion 16 of the slot but to engage against the stop shoulders 17 when the rack is drawn to fully extended position. Arranged longitudinally of the under face of the rack are a plurality of garment supporting hooks 20, any desired number of hooks being employed and the hooks being spaced apart any suitable distance, depending upon the type of garments which the rack is to support.

In applying the rack in a closet, the rack proper is first inserted in the runway from the rear end of the latter and the runway then secured either directly to the ceiling by screws 21, as shown in the drawing, or to a board or other suitable support fastened in any desired manner in the closet or show case.

From the foregoing description, the operation of my improved rack will be readily understood, particularly in view of the showing made in the drawing. Under ordinary circumstances, the rack is in retracted position, that is, with its forward end substantially flush with the forward end of the tubular runway, in which position the door of the closet or case may be readily closed. When a garment is to be removed from or hung upon the rack, the door is opened and the rack drawn out of the closet by means of the handle 18, complete withdrawal of the rack from the runway being prevented by engagement of the stop of the rack with the stop shoulders 17 of the runway. In this position, practically the entire rack body extends exteriorly of the closet or show case and its hooks are therefore readily accessible either for removing or replacing garments. After the garments have been removed or arranged, the rack may again be returned to normal position and the closet door closed.

It will of course be understood that various minor changes, such as changes in the cross sectional shaping of the runway and rack, may be made, if desired. For instance, the rack may be T-shape in section with the stem of the T projecting through the slot 16. In other words, I reserve the right to make any minor changes within the scope of the appended claim without in the slightest degree departing from the spirit of my invention.

Having thus described the invention, what is claimed as new is:

A garment hanger including a tubular runway interiorly non-circular in cross section and adapted for attachment to an overhead support, said runway being provided in its lower face with a longitudinal slot reduced adjacent its forward end to provide a stop shoulder, a rack body slidable in the runway and shaped and proportioned to prevent turning in the runway, garment supporting hooks projecting downwardly through the slot from the body, and a stop shoulder at the rear end of the rack body slidable in the slot and adapted for engagement against the stop shoulder of the runway.

In testimony whereof I affix my signature in presence of two witnesses.

EMANUEL G. KOHOUT.

Witnesses:
EMANUEL CASTKA,
EDW. F. CASTKA.